(12) United States Patent
Tang et al.

(10) Patent No.: US 7,917,161 B2
(45) Date of Patent: Mar. 29, 2011

(54) METHOD AND SYSTEM FOR DELIVERING MULTIMEDIA MESSAGES AND MULTIMEDIA MESSAGE SERVICE CENTER

(75) Inventors: Fei Tang, Shenzhen (CN); Dawei Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 423 days.

(21) Appl. No.: 11/558,612

(22) Filed: Nov. 10, 2006

(65) Prior Publication Data

US 2007/0149224 A1 Jun. 28, 2007

Related U.S. Application Data

(63) Continuation of application No. PCT/CN2005/000424, filed on Mar. 31, 2005.

(30) Foreign Application Priority Data

May 12, 2004 (CN) .......................... 2004 1 0034765

(51) Int. Cl.
G06F 15/16 (2006.01)
(52) U.S. Cl. ....................................... 455/466; 709/227
(58) Field of Classification Search .................. 455/428, 455/466; 370/395, 396; 709/206, 227; 725/62
See application file for complete search history.

(56) References Cited

U.S. PATENT DOCUMENTS

| 6,956,832 | B1 | 10/2005 | Muhonen et al. | |
|---|---|---|---|---|
| 2003/0169865 | A1* | 9/2003 | Oren | 379/207.08 |
| 2004/0185832 | A1* | 9/2004 | Prenzel et al. | 455/412.1 |
| 2005/0038892 | A1* | 2/2005 | Huang et al. | 709/227 |
| 2005/0083940 | A1* | 4/2005 | Eales et al. | 370/395.2 |
| 2005/0108334 | A1* | 5/2005 | Tam et al. | 709/206 |
| 2005/0136915 | A1* | 6/2005 | Rooke et al. | 455/428 |
| 2005/0141522 | A1* | 6/2005 | Kadar et al. | 370/396 |
| 2005/0278749 | A1* | 12/2005 | Ewert et al. | 725/62 |

FOREIGN PATENT DOCUMENTS

| EP | 1361712 | 11/2003 |
|---|---|---|
| JP | 2001197553 A | 7/2001 |
| JP | 2002518957 T | 6/2002 |

(Continued)

OTHER PUBLICATIONS

Ralph D. Graham P: "3. A Standards-based approach"; MMS: Technologies, Usage and Business Models, Feb. 10, 2004, pp. 63-85, XP002432368; http://www3.interscience.wiley.com/cgi-bin/booktext/107614044/Bookpdfstart *pp. 65-66*; *pp. 81-82*; *figure 3.11*.

(Continued)

Primary Examiner — George Eng
Assistant Examiner — Nizar Sivji

(57) ABSTRACT

A method for delivering multimedia messages includes: submitting a multimedia message containing address information of a receiving party to an MMSC by an initiating party; sending a PUSH notification by the MMSC to a short message system with an interface protocol supported by the short message system; obtaining routing information of the receiving party from HLR of the receiving party by the short message system, and sending the PUSH notification to the receiving party according to the routing information; and retrieving the multimedia message from the MMSC according to addressing information of the multimedia message containing in the PUSH notification by the receiving party. The method improves the efficiency and success rate of multimedia message delivery and lowers the cost of multimedia message delivery.

6 Claims, 3 Drawing Sheets

FOREIGN PATENT DOCUMENTS

| | | | |
|---|---|---|---|
| JP | 2002314599 A | | 10/2002 |
| KR | 2003-0070914 A | | 9/2003 |
| WO | WO99/66746 | * | 12/1999 |
| WO | 02/056615 | | 7/2002 |
| WO | 02/058356 A2 | | 7/2002 |
| WO | 03/026138 | | 3/2003 |
| WO | 03/043286 | | 5/2003 |

OTHER PUBLICATIONS

Mouly M et al:; "The GSM system for Mobile Communications, Passage"; GSM System for Mobile Communciations. Comprehensive Overview of the European Digital Cellular Systems, as L. U: Cell & Sys, 1992, pp. 465-471,556, XP002397827; ISBN: 2-9507190-0-7 *p. 560*.

ETSI, 3GPP: "Digital cellular telecommunications system (Phase 2+); Universal Mobile Telecommunications System (UMTS); Multimedia Messaging Service (MMS); Functional description; Stage 2"; ETSI TS 123 140 V5.10.0 (Mar. 2004) (3GPP TS 23.140 Version 5.10.0 Release 5); Mar. 2004; pp. 1-160; XP014016475.

Open Mobile Alliance: "Multimedia Messaging Service Client Transactions, Version 1.2, Candidate Version; Sep. 16, 2003"; Open Mobile Alliance; OMA-MMS-CTR-V1_2-20030916; Sep. 16, 2003; pp. 1-63.

Open Mobile Alliance: "WDP and WCMP Wireless Data Gateway Adapation, Version Jul. 13, 2001"; Open Mobile Alliance;WAP-159-WDPWCMPADAPT-20010713-A; Jul. 13, 2001; pp. 1-21.

WAP Forum: "Push Proxy Gateway Service, Version Jul. 13, 2001"; Wireless Application Protocol; WAP-249-PPGSERVICE-20010713-A; Jul. 13, 2001; pp. 1-20.

Open Mobile Alliance: "Multimedia Messaging Service, Encapsulation Protocol, Version 1.2, Candidate Version Sep. 15, 2003"; Open Mobile Alliance; OMA-MMS-ENC-V1_2-20030915-C; Sep. 15, 2003; p. 61.

European Search Report for European Patent Application No. 05741909.5, dated Oct. 15, 2008.

"Short Message Peer to Peer (SMPP) Interface Specification" [Online]; Mar. 7, 2003; pp. 1-47; Retrieved from the Internet: URL:http://web.archive.org/web/20030307225542/http://opensmpp.logica.com/CommonPart/Documentation/external/SMPP-IF-SPEC.v3.3.pdf> [retrieved on Feb. 20, 2008].

3GPP: "3rd Generation Partnership Project; Technical Specification Group 2 (3G TS 23.140 version 1.0.0)" 3GPP TS 23.140 V1.0.0 (Dec. 1999); [Online]; Dec. 1999; pp. 1-26; Retrieved from the Internet: URL:http://www.3gpp.org/ftp/Specs/archive/23_series/23.140/23140-100.zip> [retrieved on Feb. 20, 2008].

"Faster GSM Modem Speeds with SMS over GPRS" [Online]; Sep. 4, 2003; pp. 1-2; Retrieved from the Internet: URL:http://web.archive.org/web/20040223124657/www.nowsms.com/support/bulletins/tb-nowsms-007.htm> [retrieved on Feb. 20, 2008].

European Office Action for European Application No. 05741909.5, dated Feb. 29, 2008.

European Office Action for European Patent Application No. 05 741 909.5, dated Oct. 9, 2007.

Japanese Office Action for Japanese Patent Application No. 2007-511834, dated Nov. 10, 2009, and partial English translation thereof.

3rd Generation Partnership Project; Technical Specifications Group Core Network and Terminals; Multimedia Messaging Service (MMS); Functional description; Stage 2 (Release 6); 3GPP TS 23.140 V6.14.0 (Sep. 2006); Technical Specification; Global System for Mobile Communications; 220 pages.

"Push Access Protocol"; Version 29 Apr. 2001; Wireless Application Protocol; WAP-247-PAP-200104290-a; 1999-2001, Wireless Application Protocol Forum, Ltd.; http://www.wapforum.org/what/copyright.htm; 49 pages.

European Office Action for European Patent Application No. 05741909.5, dated Feb. 13, 2009.

Korean Office Action for Korean Patent Application No. 10-2006-7025929, dated Jan. 30, 2008, and partial English translation thereof.

Japanese Notice of Reasons of Rejection for Japanese Patent Application No. 2007-511834, dated May 18, 2010, and partial English translation thereof.

* cited by examiner

METHOD AND SYSTEM FOR DELIVERING MULTIMEDIA MESSAGES AND MULTIMEDIA MESSAGE SERVICE CENTER

CROSS-REFERENCE TO RELATED APPLICATIONS

This application is a continuation of International Application No. PCT/CN2005/000424 filed on Mar. 31, 2005. This application claims the benefit of Chinese Application No. 200410034765.3 filed on May 12, 2004. The disclosures of the above applications are incorporated herein by reference.

FIELD

The present disclosure relates to multimedia information communication technology, and more specifically to a method and system for delivering multimedia messages and a Multimedia Message Service Center (MMSC).

BACKGROUND

The statements in this section merely provide background information related to the present disclosure and may not constitute prior art.

Multimedia Message Service Center (MMSC) serves to deliver multimedia messages of text, graphic, video, audio and other media formats on the networks. The MMSC activates the sending flow when it receives a multimedia message sent from a Multimedia Message Service (MMS) terminal, a Value-Added Service Provider (VASP), or an email server to the MMS. The sending flow includes two phases: PUSH notification flow and message retrieval flow. At present, the PUSH notification flow of MMS service mainly refers to that the MMSC sends one or more short messages containing PUSH notification to the receiving terminal. The PUSH notification includes the information of the multimedia messages, e.g., the addressing information required by the receiving terminal for retrieving the multimedia message, the sender ID, the subject of multimedia message and the address of the receiving terminal. The addressing information includes the MMSC address and the sole identification of multimedia message in the MMSC. The receiving terminal activates the message retrieval flow when it receives the PUSH notification, i.e., it initiates a message retrieval request to the MMSC that saves the multimedia message and retrieves the multimedia message according to the addressing information in the PUSH notification.

The multimedia message delivery are very similar in GSM, GPRS, WCDMA, CDMA95, CDMA2000 and other networks, therefore, the multimedia message delivery in GSM network is taken as the example for a description of the multimedia message delivery solution in related art.

FIG. 1 illustrates a whole procedure of delivering a multimedia message from the initiating party, e.g., an MMS terminal, a VASP or a mail server, to the receiving party, e.g., a MSC/MMS terminal in related art, which includes the following steps:

Step 11: The initiating party of multimedia message submits the multimedia message to the MMSC, with the address information of the receiving MMS terminal, e.g., a mobile phone number, carried in the multimedia message.

Step 12: Upon receiving the multimedia message, the MMSC activates the PUSH notification flow to send a PUSH notification to the receiving MMS terminal. Specifically, the PUSH notification flow includes the following steps:

Step 1201: The MMSC sends a PUSH information message (push_message) to the Wireless Application Gateway (WAPGW), and records the times of executing this step. The push_message carries the PUSH notification which contains the addressing information required by the receiving MMS terminal for retrieving the multimedia message, the sender ID, the subject of multimedia message, and address information of the receiving MMS terminal. The addressing information includes the MMSC address and the sole identification of the multimedia message in the MMSC.

Step 1202: the WAPGW returns a PUSH response message (push_response) to the MMSC when it receives the push_message.

Step 1203: The WAPGW adopts the interface protocol between the WAPGW and the Short Message Service Center (SMSC), i.e., the Short Message Peer to Peer Protocol (SMPP) to package up the PUSH notification in the push_message into a short message, and adopts SMPP to send the submit message (submit_sm) to the SMSC, with the short message containing the PUSH notification carried in the message, and records the times of executing this step. In an actual network of an operator, the interface protocol between the WAPGW and the SMSC may also be Universal Computer Protocol (UCP), Computer Interface Message Delivery (CIMD) protocol or other protocols of the same type.

Step 1204: Upon receiving the submit_sm, SMSC returns a submit response (submit_sm_resp) to the WAPGW, and executes Step 1205.

Steps 1205~1208 are the flow of the SMSC sending short messages to the receiving MMS terminal. Specifically, the flow includes the following steps:

Step 1205: The SMSC determines the address of the receiving MMS terminal's Home Location Register (HLR) according to the address information of the receiving MMS terminal carried by the PUSH notification in submit_sm, sends a routing request message (map_sri_for_sm_req) to the HLR, and records the times of executing this step. If the network is a CDMA network, the routing request message is a SMSREQ message.

Step 1206: Upon receiving the map_sri_for_sm_req, the HLR returns a routing response message (map_sri_for_sm_resp) to the SMSC, with the address of the MSC in which the receiving MMS terminal currently locates carried in the message.

If the network is a CDMA network, the routing response message may be a smsreq message. If the network is a GPRS or a WCDMA network, the routing information carried in the routing response message may be the address of the MSC or SGSN in which the receiving terminal currently locates.

Step 1207: SMSC reads the routing information from map_sri_for_sm_resp, and sends a short message forwarding request message (map_mt_fwd_sm_req) to the receiving MMS terminal via the receiving MSC according to the routing information, with the short message containing the PUSH notification carried in the short message forwarding request message.

If the network is a CDMA network, the short message forwarding request message may be a Short Message Delivery Peer to Peer (SMDPP) request message.

Step 1208: The receiving MMS terminal returns a short message forwarding response message (map_mt_fwd_sm_resp) to the SMSC via the receiving MSC, with the information indicating that the PUSH notification carried in the short message forwarding response message has been successfully sent. The SMSC decides in a preset time whether it has received the map_mt_fwd_sm_resp carrying the information indicating whether the PUSH notification is successfully sent, and if received, executes Step 1209; otherwise, the SMSC decides whether to resend the PUSH notification and the resending time according to the internal resend strategy. If the SMSC decides to resend the PUSH notification, it decides whether the times of executing Step 1205 exceeds the preset value, and if it exceeds, the SMSC decides that the sending of PUSH notification has failed and executes Step 1209; otherwise, the SMSC adopts the resend strategy and returns to Step 1205.

If the network is a CDMA network, the response message returned by the MSC to the SMSC may be smdpp.

Step 1209: The SMSC sends a delivery report message (deliver_sm) to the WAPGW, with the information indicating whether the PUSH notification has been successfully sent carried in the deliver_sm.

Step 1210: Upon receiving the deliver_sm, the WAPGW returns a delivery report response message (deliver_sm_resp) to the SMSC and decides whether the PUSH notification has been successfully sent according to the delivery report message, if successful, executes Step 1211; otherwise, the WAPGW decides whether to resend the PUSH notification according to the internal resend strategy. If the WAPGW decides to resend the PUSH notification, it decides whether the times of executing Step 1203 exceeds the preset value, and if exceeds, the WAPGW decides that the sending of PUSH notification has failed and executes Step 1211; otherwise, the WAPGW adopts the resend strategy and returns to Step 1203.

Step 1211: WAPGW sends to the MMSC a result notification message (resultnotification_message), with the information indicating whether the PUSH notification has been successfully sent carried in the result notification message.

Step 1212: Upon receiving the resultnotification_message, the MMSC returns a result notification response message (resultnotification_response) to the WAPGW, and decides whether the PUSH notification has been successfully sent according to the resultnotification_message, if successful, the WAPGW terminates the PUSH notification flow; otherwise, the SMSC decides whether to resend the PUSH notification and the resending time according to the internal resend strategy. If the MMSC decides to resend the PUSH notification, it decides whether the times of executing Step 1201 exceeds the preset value, if it exceeds, the MMSC decides that the sending of PUSH notification has failed, terminates the multimedia message delivery flow, and then decides that the delivery of multimedia message has failed and executes Step 17; otherwise, the MMSC adopts the resend strategy and returns to Step 1201.

The steps of 13 to 17 are multimedia message retrieval flow. Specifically, the retrieval flow includes the following steps:

Step 13: Upon receiving the short message carrying the PUSH notification, the receiving MMS terminal processes according to its own selected mode. If the receiving MMS terminal selects delayed retrieval of multimedia message, it reports to the MMSC that it has received the PUSH notification via the notification response (MM1_notification.RES) according to the addressing information for retrieving multimedia message carried in the PUSH notification, and then executes Step 14. If the receiving MMS terminal selects prompt retrieval of multimedia message, it executes Step 14 directly.

Step 14: When the multimedia retrieval time is reached, the receiving MMS terminal sends to the MMSC a multimedia message retrieval request (MM1_retrieve.REQ) according to the addressing information for retrieving multimedia message carried in the PUSH notification.

Step 15: The MMSC sends the multimedia message to the receiving MMS terminal via the multimedia message retrieval response message (MM1_retieve.RES).

Step 16: In the case of delayed retrieval, the receiving MMS terminal returns the receive status of the multimedia message to the MMSC via multimedia message acknowledgement message (MM1_acknowledgement.REQ). In the case of prompt retrieval, the receiving MMS terminal returns the receive status of the multimedia message to the MMSC via the MM1_notification.RES.

Step 17: If there is a requirement for the delivery status of multimedia message by the initiating party, the MMSC returns the delivery status report of the multimedia message to the initiating party, with the receiving party's receive status of the multimedia message carried in the delivery status report. If there is no requirement for the delivery status of multimedia message by the initiating party, the flow comes to an end.

It can be seen from the above flow that the PUSH notification is critical to the entire MMS business, and is an essential requisite to ensure that the receiving party obtains messages normally.

SUMMARY

An embodiment of the present invention provides a method for delivering multimedia messages. The method for delivering multimedia message includes:

submitting, by an initiating party, a multimedia message containing address information of a receiving party to a Multimedia Message Service Center (MMSC);

sending, by the MMSC, a PUSH notification to a short message system through an interface protocol supported by the short message system;

obtaining, by the short message system, routing information of the receiving party from HLR of the receiving party, and sending the PUSH notification to the receiving party according to the routing information;

obtaining, by the receiving party, multimedia messages from the MMSC according to addressing information of the multimedia message contained in the PUSH notification.

Another embodiment of the present invention provides A system for delivering multimedia message. The system includes:

an initiating party, for submitting a multimedia message containing address information of a receiving party to a Multimedia Message Service Center (MMSC);

the MMSC, for sending a PUSH notification to a short message system with an interface protocol supported by the short message system;

the short message system, for obtaining routing information of a receiving party from HLR of the receiving party, and sending the PUSH notification to the receiving party according to the routing information;

the receiving party, for obtaining the multimedia message from the MMSC according to addressing information of the multimedia message contained in the PUSH notification.

A third embodiment of the present invention provides a Multimedia Message Service Center (MMSC). The MMSC includes an interface protocol module supported by a short message system. Upon receiving a multimedia message containing address information of a receiving party from an initiating party, the MMSC the MMSC instructing the interface protocol module to send the PUSH notification to the short message system.

A fourth embodiment of the present invention provides a method for delivering multimedia message by MMSC. The method for delivering multimedia message by MMSC includes: upon receiving a multimedia message containing address information of a receiving party, the MMSC send a PUSH notification to a short message system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
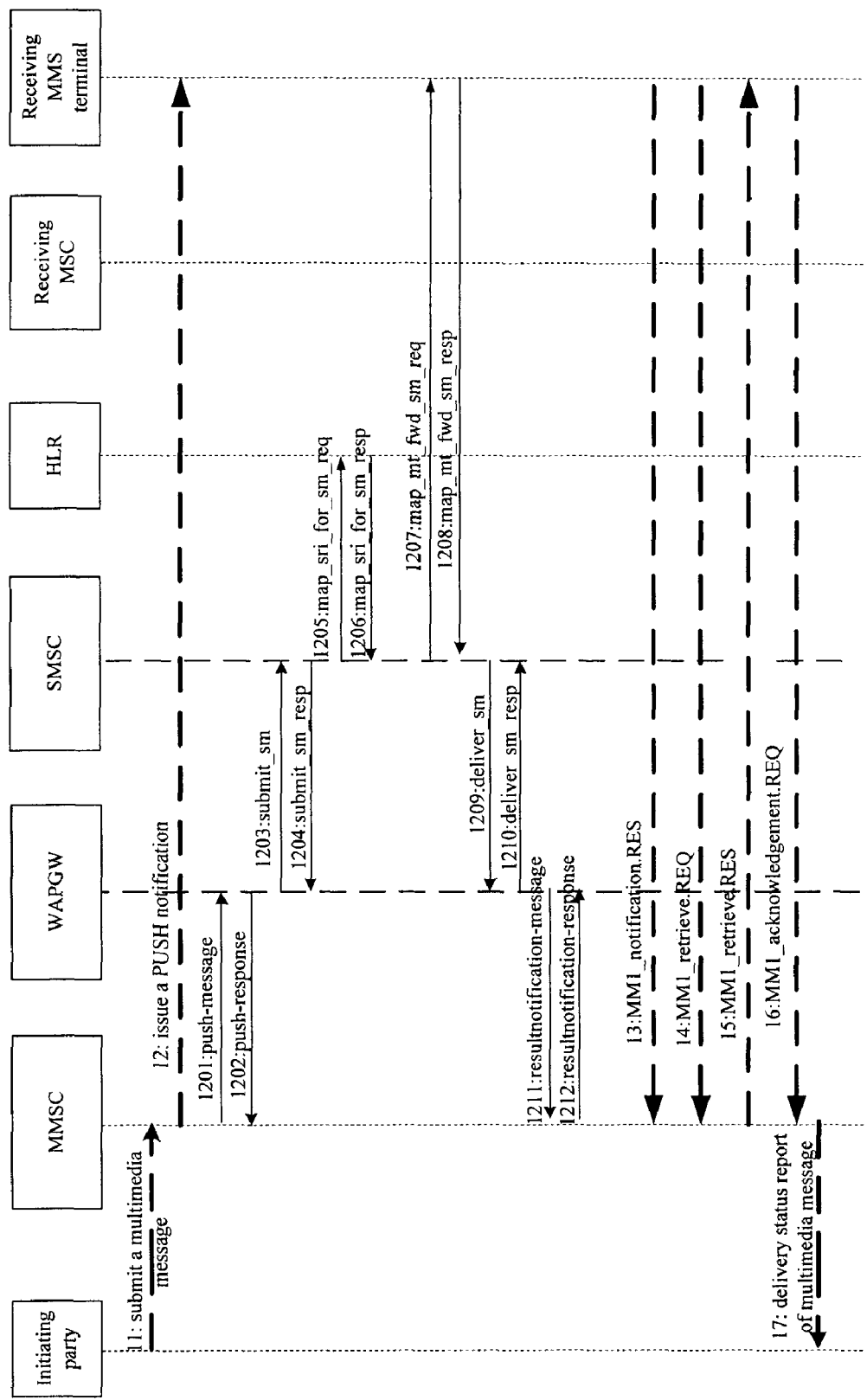
FIG. 1 is a flow chart illustrating the delivery of multimedia message in related art.

The following description is merely exemplary in nature and is not intended to limit the present disclosure, application, or uses. It should be understood that throughout the drawings, corresponding reference numerals indicate like or corresponding parts and features.

A detailed description of the present invention is hereinafter given with reference to specific embodiments and the accompanying drawings.

According to an embodiment of the method of the present invention, the PUSH notification is sent through direct communication between the MMSC and the short message system, without the involvement of the WAPGW. The short message system mentioned here includes the SMSC, or includes the short message gateway and the SMSC.

According to an embodiment of the present invention, an interface protocol module supported by the short message system is added into the MMSC. If the short message system includes the SMSC, the interface protocol module for communicating with the SMSC directly is added in the MMSC, for instance, a SMPP module in the GSM network, and UCP module, CIMD protocol module or other protocol module in other networks. If the short message system includes the short message gateway and the SMSC, a short message gateway protocol module for communicating with the short message gateway is added in the MMSC, for instance, the China Mobile Peer to Peer (CMPP) protocol, China Union Short message Gateway Interface Protocol (SGIP) or other protocol modules of the same type.

The delivery of multimedia messages are similar in GSM, GPRS, WCDMA, CDMA95, CDMA2000 and other networks, therefore, the delivery of multimedia messages in GSM is taken as an example for the description of the method provided by the present invention.

Figure 2:
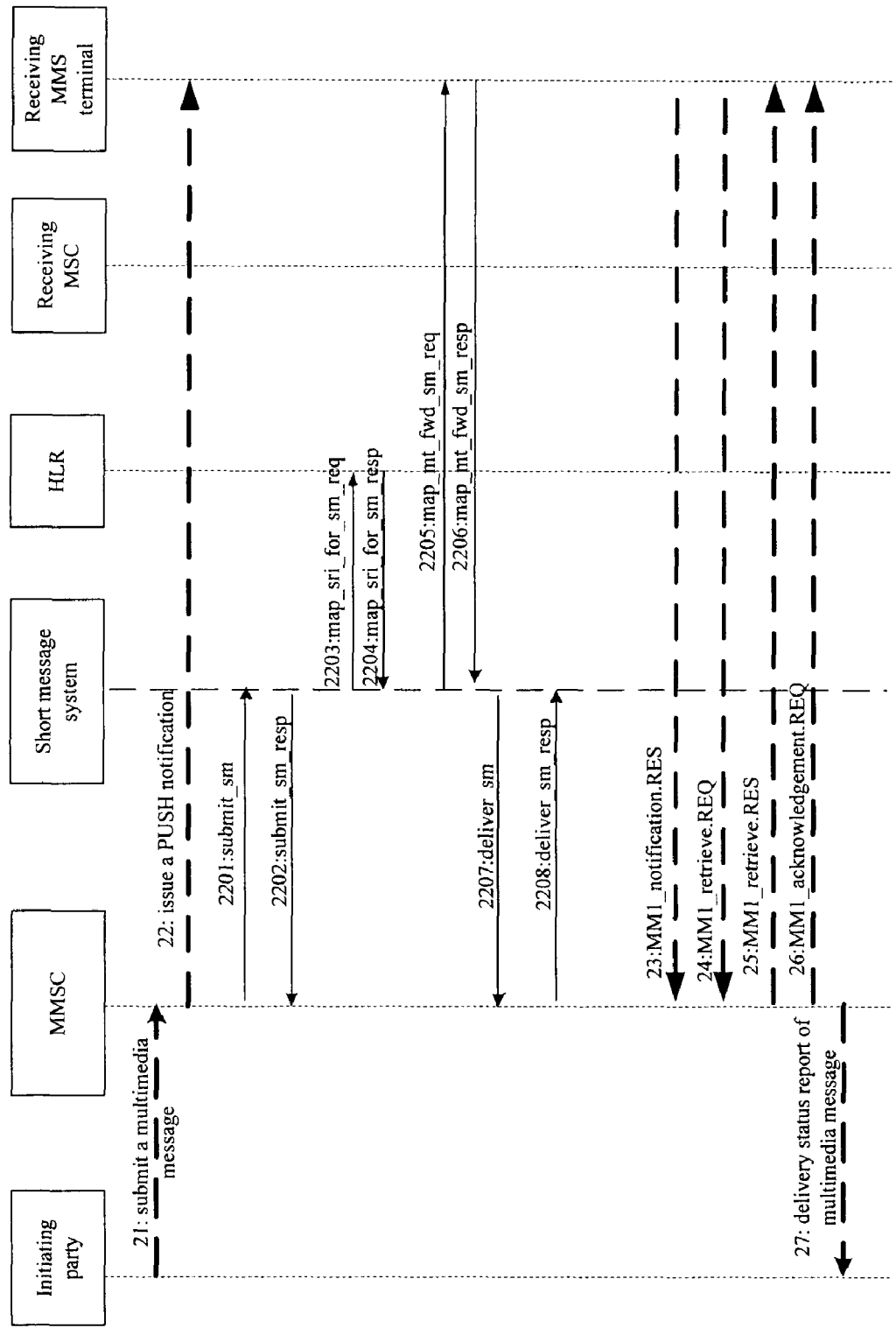
FIG. 2 is a flow chart illustrating the delivery of multimedia message in the case that the short message system is the short message center according to an embodiment of the present invention.

As shown in FIG. 2, if the short message system of the present invention includes the SMSC, the whole process of the multimedia message initiating party, for instance, a MMS terminal, a VASP or a mail server, delivering a multimedia message to the receiving MMS terminal includes the following steps:

Step 21: The multimedia message initiating party submits the multimedia message to the MMSC, with the address information of the receiving MMS terminal, for instance, a mobile phone number, carried in the multimedia message.

Step 22: Upon receiving the multimedia message, the MMSC activates the PUSH notification flow to send a PUSH notification to the receiving MMS terminal, with the addressing information required by the receiving MMS terminal for retrieving the multimedia message, the sender ID, the subject of the multimedia message, and the address information of the receiving MMS terminal carried in the notification. The addressing information includes the MMSC address and the sole ID of the multimedia message in the MMSC. Specifically, the PUSH notification flow includes the following steps:

Step 2201: The MMSC adopts the interface protocol supported by the SMSC, e.g., the SMPP, to package up the PUSH notification into a short message, sends the submit message (submit_sm) to the SMSC by the interface protocol, with the short message carrying the PUSH notification carried in the submit_sm, and records the times of executing this step.

If the network is another network, the UCP, CIMD or other protocols of the same type can be adopted as the interface protocol between the MMSC and the SMSC. The SMPP protocol involved in this method can be substituted by the above mentioned UCP, CIMD or other protocols of the same type.

Step 2202: Upon receiving the submit_sm, the SMSC returns a submit response message (submit_sm_resp) to the MMSC.

Steps 2203~2206 are the flow of the SMSC sending the short message to the receiving MMS terminal. The flow includes the following steps:

Step 2203: The SMSC determines the address of the receiving MMS terminal's Home Location Register (HLR) according to the address information of the receiving MMS terminal carried in the PUSH notification in submit_sm, sends a routing request message (map_sri_for_sm_req) to the HLR, and records the times of executing this step.

If the network is a CDMA network, the routing request message is a SMSREQ message.

Step 2204: Upon receiving the map_sri_for_sm_req, the HLR returns a routing response message (map_sri_for_sm_resp) to the SMSC. The map_sri_for_sm_resp contains the routing information of the receiving MMS terminal. i.e., the address of the MSC in which the Receiving MMS terminal locates.

If the network is a CDMA network, the routing response message is a smsreq message. If the network is a GPRS or WCDMA network, the routing information carried in the routing response message is the address of the Serving GPRS Service Node (SGSN).

Step 2205: The SMSC reads the routing information carried in the map_sri_for_resp, and sends the short message forwarding request message (map_mt_fwd_sm_req) to the receiving MMS terminal via the receiving MSC according to the routing information, with the short message including the PUSH notification to be sent to the receiving MMS terminal carried in the map_mt_fwd_sm_req. If the network is a CDMA network, the short message forwarding request message is a SMDPP message.

Step 2206: The receiving MMS terminal returns a short message forwarding response message (map_mt_fwd_sm_resp) to the SMSC via the MSC in which the Receiving MMS terminal locates. The map_mt_fwd_sm_resp contains the information indicating whether the PUSH notification has been successfully sent. The SMSC decides in a preset time whether it has received the map_mt_fwd_sm_resp carrying the information indicating that the PUSH notification has been successfully sent, if yes, proceeds to the next step; otherwise, the SMSC decides whether to resend the PUSH notification and the resending time according to the internal resend strategy. If the SMSC decides to resend the PUSH notification, It further decides whether the times of executing Step 2203 exceeds the preset times, and if it does, the SMSC decides that the PUSH notification sending has failed and proceeds to the next step; otherwise, the SMSC adopts the resend strategy and returns to Step 2203.

Additionally, if the network is a CDMA network, the response message returned by the MSC to the SMSC is smdpp.

Step 2207: The SMSC sends a delivery report message (deliver_sm) to the MMSC, with the information indicating whether the PUSH notification carried in the deliver_sm has been successfully sent.

Step 2208: Upon receiving the deliver_sm, the MMSC returns a delivery report response message (deliver_sm_resp) to the SMSC and decides whether the PUSH notification has been successfully sent according to the deliver_sm, and if it is successful, the PUSH notification flow ends; otherwise, the MMSC decides whether to resend the PUSH notification and the resending time according to the internal resend strategy. If the MMSC decides to resend the PUSH notification, it further decides whether the times of executing Step 2201 exceeds the preset times, and if it exceeds the preset times, the MMSC decides that the PUSH notification sending has failed, terminates the multimedia message delivery flow, decides that the delivery of multimedia message has failed and proceeds to Step 17; otherwise, the MMSC adopts the resend strategy and returns to Step 2201.

The steps of 23 to 27 are multimedia message retrieval flow. Specifically, the retrieval flow includes the following steps:

Step 23: Upon receiving the PUSH notification, the receiving MMS terminal processes according to its own selected mode. If the receiving MMS terminal selects delayed retrieval of multimedia message, it reports to the MMSC that it has received the PUSH notification via the notification response message (MM1_notification.RES) according to the addressing information for retrieving the multimedia message carried in the PUSH notification, and then proceeds to Step 24. If the receiving MMS terminal selects prompt retrieval of multimedia message, it proceeds to Step 24 directly.

Step 24: When the multimedia retrieval time is reached, the receiving MMS terminal sends to the MMSC a multimedia message retrieval request message (MM1_retrieve.REQ) according to the addressing information for retrieving the multimedia message carried in the PUSH notification.

Step 25: The MMSC sends the multimedia message to the receiving MMS terminal via the retrieve response message (MM1_retieve.RES).

Step 26: In the case of delayed retrieval, the receiving MMS terminal returns the multimedia message receive status to the MMSC via the multimedia message acknowledgement message (MM1_acknowledgement.REQ). In the case of prompt retrieval, the receiving MMS terminal returns the multimedia message receive status to the MMSC via the MM1_notification.RES.

Step 27: If there is a requirement for the delivery status of multimedia message by the initiating party, the MMSC returns the delivery status report of the multimedia message to the initiating party, with the receiving party's receiving status of the multimedia message carried in the delivery status report. If there is no requirement for the delivery status of multimedia message by the imitating party, the flow comes to an end.

The networking solution of the present invention can be adopted in GSM, GPRS, WCDMA, CDMA95, CDMA2000 or other mobile networks and fixed networks, i.e., the MMSC adopts the associated interface protocol to directly communicate with the short message systems of various mobile networks and fixed networks to deliver multimedia messages. For instance, in CDMA network, the MMSC can directly connect the CDMA short message center (MC) to deliver multimedia messages.

Figure 3:
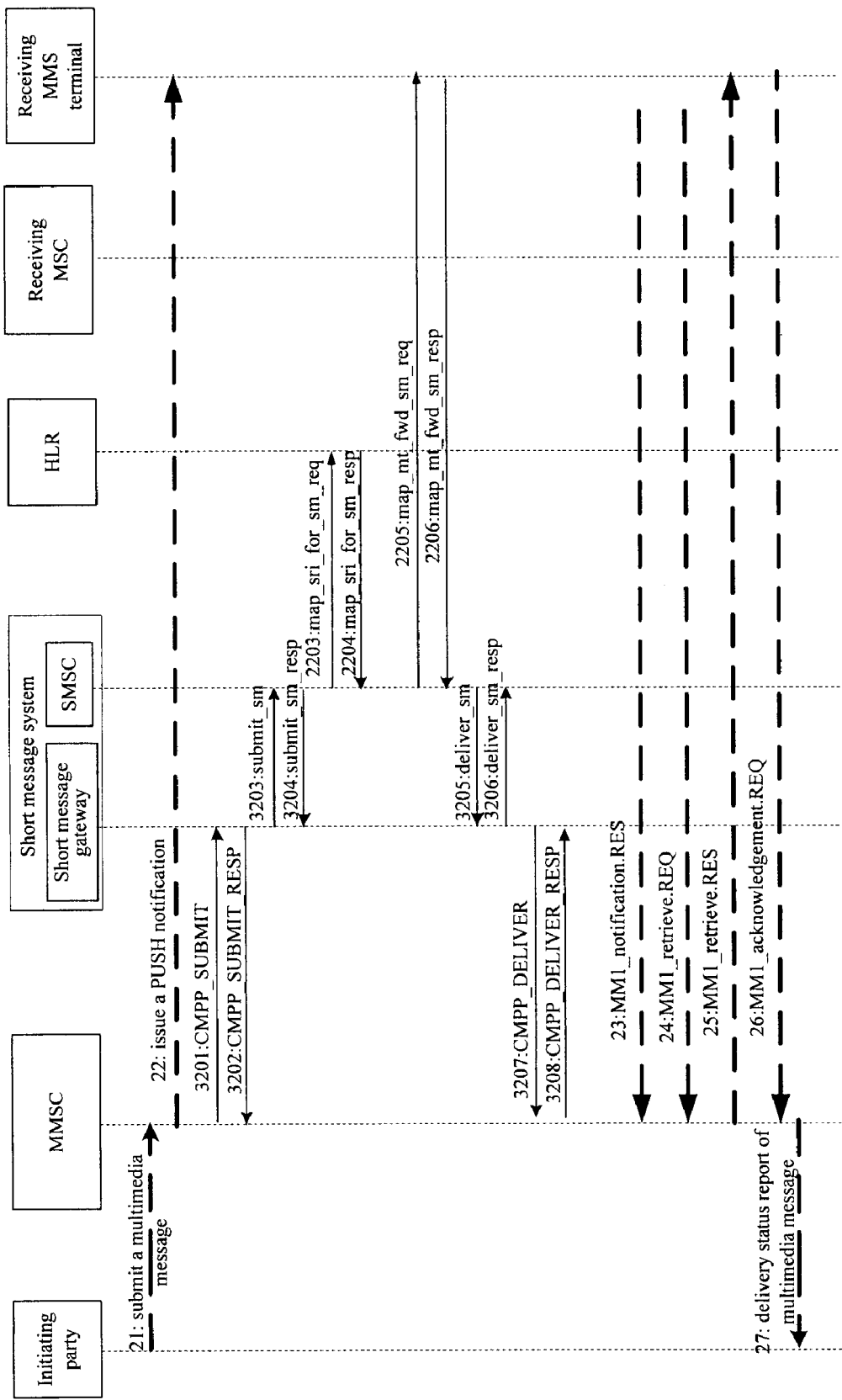
FIG. 3 is a flow chart illustrating the delivery of multimedia message in the case that the short message system includes the short message gateway and the short message center according to an embodiment of the present invention.

As shown in FIG. 3, if the short message system of the present invention includes the short message gateway and the SMSC, the whole delivery process of multimedia message initiating party sending a multimedia message to the receiving MMS terminal is the same as that illustrated in FIG. 2, except the minor difference in the interactive process between the MMSC and the short message system. Therefore, the following description is just concentrated on the interactive process between the MMSC and the short message system.

Upon receiving the multimedia message, the MMSC activates the PUSH notification flow which includes the following steps:

Step 3201: The MMSC adopts the interface protocol between the MMSC and the short message gateway, for instance, CMPP, to package up the PUSH notification into a short message, adopts the CMPP to send the PUSH information message (CMPP_SUBMIT) carrying the PUSH notification to the short message gateway, and records the times of executing this step.

Step 3202: Upon receiving the CMPP_SUBMIT, the short message gateway returns the PUSH response message (CMPP_SUBMIT_RESP) to the MMSC.

Step 3203: The short message gateway uses the interface protocol between the short message gateway and the SMSC, for instance, SMPP, to package up the PUSH notification into a short message carrying the PUSH notification, adopts the SMPP to send the submit message (submit_sm) carrying the PUSH notification to the SMSC, and records the times of executing this step. The interface protocol can be UCP, CIMD or other protocols of the same type.

Step 3204: Upon receiving the submit_sm, the SMSC returns the submit response message (submit_sm_resp) to the short message gateway, and proceeds to Step 2203.

Then Steps 2203 to 2206 are carried out successively, which are described in the explanation of FIG. 2. After Step 2206 is carried out, the following steps will be carried out:

Step 3205: The SMSC sends a deliver_sm to the short message gateway, with the information indicating whether the PUSH notification carried in the deliver_sm has been successfully sent.

Step 3206: Upon receiving the deliver_sm, the short message gateway returns a deliver_sm_resp to the SMSC, and decides whether the PUSH notification has been successfully sent according to the deliver_sm, and if it is successful, the SMSC proceeds to Step 3207; otherwise, the SMSC further decides whether the times of executing Step 3203 exceeds the preset times. If the times of executing Step 3203 exceeds the present times, the short message gateway decides that the PUSH notification sending has failed and proceeds to Step 3207. If the times of executing Step 3203 doesn't exceed the present times, the short message gateway adopts the resend strategy and returns to Step 3203.

Step 3207: The short message gateway sends a result notification message (CMPP_DELIVER) to the MMSC, with the information indicating the PUSH notification carried in the CMPP_DELIVER has been successfully sent.

Step 3208: Upon receiving the CMPP_DELIVER, the MMSC returns the result notification response message (CMPP_DELIVER_RESP) to the short message gateway, and decides whether the PUSH notification has been successfully sent according to the CMPP_DELIVER, and if it is successful, the PUSH notification flow ends; otherwise, the MMSC further decides whether the times of executing Step 3201 exceeds the preset times. If the times of executing Step 3201 exceeds the preset times, the MMSC decides that the PUSH notification sending has failed, and terminates the multimedia message delivery flow. If the times of executing Step 3201 exceeds the preset times, the MMSC adopts the resend strategy and returns to Step 3201.

The retrieval flow of multimedia message is described in the above mentioned Steps 23 to 27.

The foregoing description only relates to the preferred embodiments of the present invention, and is not intended to limit the protection scope thereof. All variants and substitutions of the embodiments realizable by those skilled in the art should be covered by the protection scope of the present invention.

What is claimed is:

1. A method for delivering multimedia message, comprising:

setting an interface protocol module capable of supporting direct communication between a Multimedia Message Service Center (MMSC) and a short message system in the MMSC and adapted to send messages through an interface protocol supported by the short message system;

submitting, by an initiating party, a multimedia message containing address information of a receiving party to the MMSC;

packaging, by the MMSC, a PUSH notification into a short message;

sending, by the MMSC, the PUSH notification carried in the short message to the short message system through the interface protocol module using the interface protocol supported by the short message system;

sending, by the short message system, a response to the MMSC;

obtaining, by the short message system, routing information of the receiving party from HLR of the receiving party, and sending the PUSH notification to the receiving party according to the routing information;

obtaining, by the receiving party, multimedia messages from the MMSC according to addressing information of the multimedia message contained in the PUSH notification;

wherein the short message system is a combination of short message gateway and a short message center;

wherein said sending the PUSH notification comprises:

b1'. adopting the interface protocol between the MMSC and the short message center to package up the PUSH notification into a message by the MMSC and sending the message containing the PUSH notification to the short message gateway;

b2'. adopting the interface protocol between the short message gateway and the short message center to package up the PUSH notification into the short message and sending the short message containing the PUSH notification to the short message center by the short message gateway;

the method further comprises:

c3'. returning a short message forwarding response message to the short message center, by the receiving party after sending the PUSH notification to the receiving party, with information indicating whether the PUSH notification contained in the short message forwarding response message has been successfully sent; deciding by the short message center in a preset time whether it has received the short message forwarding response message containing the information indicating the PUSH notification has been successfully sent, and if it is received, proceeding to c4', otherwise, deciding by the short message center whether times of sending the PUSH notification to the receiving party exceeds preset times, and if the times exceeds the preset times, deciding by the short message center that the PUSH notification sending has failed and proceeding to c4', and if the times does not exceed the preset times, adopting a resend strategy and resending the PUSH notification to the receiving party by the short message center;

c4'. sending a delivery report message to the short message gateway by the short message center, with information indicating whether the PUSH notification contained in the delivery report message has been successfully sent;

c5'. upon receiving the delivery report message, deciding by the short message gateway whether the PUSH notification has been successfully sent according to the delivery report message, and if successful, proceeding to c6'; otherwise, deciding by the short message gateway whether times of executing b2' exceeds preset times; and if the times of executing b2' exceeds the preset times, deciding by the short message gateway that the PUSH notification sending has failed and proceeding to c6'; and if the times of executing b2' does not exceed the preset times, adopting the resend strategy and returning to b2' by the short message gateway;

c6'. sending a result notification message to the MMSC by the short message gateway with information indicating whether the PUSH notification contained in the result notification message has been successfully sent;

c7'. upon receiving the result notification message, deciding by the MMSC whether the PUSH notification has been successfully sent according to the result notification message, and if successful, terminating the process of sending the PUSH notification; otherwise, deciding by the MMSC whether times of executing b1' exceeds preset times; and if the times of executing b1' exceeds the preset times, deciding by the MMSC that the PUSH notification sending has failed and terminating the process of multimedia message delivering; and if the times of executing b1' does not exceed the preset times, adopting the resend strategy and returning to b1' by the MMSC.

2. The method according to claim 1, wherein the interface protocol between the MMSC and the short message gateway comprises one of: China Mobile Peer to Peer (CMPP) protocol or China Union Short message Gateway Interface Protocol (SGIP);

the interface protocol between the short message gateway and the short message center comprises one of: SMPP, UCP and CIMD.

3. The method according to claim 1, wherein said obtaining routing information of the receiving party from HLR of the receiving party by the short message system comprises:

c1. determining, by the short message center, the HLR of the receiving party according to the address information of the receiving party contained in the PUSH notification and sending a routing request message to the HLR;

c2. upon receiving the routing request message, returning, by the HLR, a routing response message to the short message center, with routing information of the receiving party contained in the routing response message; obtaining, by the short message center, the routing information of the receiving party from the routing response message upon receiving the routing response message.

4. The method according to claim 1, wherein said obtaining the multimedia message from the MMSC according to addressing information of the multimedia message contained in the PUSH notification comprises:

d1. sending a multimedia message retrieval request to the MMSC according to the addressing information for retrieving the multimedia message contained in the PUSH notification by the receiving party;

d2. sending the multimedia message to the receiving party via a multimedia message retrieval response by the MMSC;

d3. returning receiving status of the multimedia message to the MMSC by the receiving party.

5. The method according to claim 4, further comprising:

selecting a retrieval mode, by the receiving party before d1, and if selecting delayed retrieval of multimedia message, reporting to the MMSC that the PUSH notification has been received via a notification response according to the addressing information for retrieving the multimedia message contained in the PUSH notification, and proceeding to d1; and if selecting prompt retrieval of multimedia message, proceeding to d1 directly.

6. The method according to claim 1, wherein the network to which the short message system belongs comprises one of: GSM network, GPRS network, WCDMA network, CDMA95 network and CDMA2000 network.

* * * * *